United States Patent
Hong

[19]

[11] Patent Number: 6,135,907
[45] Date of Patent: Oct. 24, 2000

[54] APPARATUS AND METHOD FOR AUTOMATIC SPEED CHANGE TRANSMISSION UTILIZING CONTINUOUS ELASTIC DRIVE BELT OF HIGH ELONGABILITY

[75] Inventor: Shane Yuan Hong, New York, N.Y.

[73] Assignee: The Trustees of Columbia University in the City of New York, New York, N.Y.

[21] Appl. No.: 09/315,424

[22] Filed: May 20, 1999

Related U.S. Application Data

[63] Continuation-in-part of application No. 08/706,528, Sep. 4, 1996, Pat. No. 5,957,797.

[51] Int. Cl.[7] ................................ F16H 7/00; F16H 1/28
[52] U.S. Cl. ........................................... 474/148; 474/205
[58] Field of Search ................................ 474/148, 150, 474/152, 153, 161, 202, 204, 205, 239

[56] References Cited

U.S. PATENT DOCUMENTS

| | | | |
|---|---|---|---|
| 254,089 | 2/1882 | Briggs | 474/239 |
| 375,308 | 12/1887 | Arnao, Jr. | 474/239 |
| 386,335 | 7/1888 | Midgley | 474/239 |
| 924,324 | 6/1909 | Dalton | 474/239 |
| 1,371,513 | 3/1921 | Nicherson | 474/239 |
| 1,586,353 | 5/1926 | Colegrove | 474/239 |
| 2,251,772 | 8/1941 | Zuber | 474/239 |
| 2,307,192 | 1/1943 | Boege | 474/239 |
| 5,405,299 | 4/1995 | Kabo et al. | 474/205 |
| 5,662,541 | 9/1997 | Rooves | 474/205 |
| 5,957,797 | 9/1999 | Hong | 474/205 |

*Primary Examiner*—David A. Bucci
*Assistant Examiner*—Matthew A. Kaness
*Attorney, Agent, or Firm*—Baker & Botts L.L.P.

[57] ABSTRACT

The invention is an apparatus and method for providing an automatic speed change transmission for transmitting power from a drive wheel to a driven wheel by way of an elastic drive belt. The driven wheel may be made to turn at a desired different speed from the drive wheel supplying the driving power by proper selection of the respective radii of the wheels and of the elastic drive belt. When a load or tension is applied to a portion of the drive belt by the drive wheel, the tensioned portion of the drive belt—which is selected to be capable of maximal elongation under tension ranging from ten percent (10%) to nineteen-hundred percent (1900%) beyond its untensioned length—stretches to a substantial extent, thus causing the driven wheel to turn faster to accommodate the elongated belt portion. The untensioned belt portion remains unstretched. Thus, the speed of the respective wheels may be stepped up or stepped down to a desired ratio by appropriate selection of belt elasticity and applied load. The invention provides a simple automatic power transmission system and method for use in vehicles and other applications as an alternative to complicated and inefficient multi-component manual, automatic, and variable transmissions that use gears, clutches, etc.

18 Claims, 4 Drawing Sheets

APPARATUS AND METHOD FOR AUTOMATIC SPEED CHANGE TRANSMISSION UTILIZING CONTINUOUS ELASTIC DRIVE BELT OF HIGH ELONGABILITY

This application is a continuation-in-part of U.S. Application Ser. No. 08/706,528, filed Sep. 4, 1996, now U.S. Pat. No. 5,957,797, issued Sep. 28, 1999.

BACKGROUND OF THE INVENTION

The present invention relates in general to transmissions for automatically changing speeds of vehicles or machinery and, more particularly, to a new design for a greatly simplified automatic transmission which can be used in a wide variety of applications including bicycles, lawn and garden equipment, tractors, motorcycles, automobiles, and other machinery for effecting automatic speed changes as power is transmitted to a load which is driven manually, by an electric motor or by an internal combustion engine. More particularly, a fixed diameter drive wheel affixed to a drive shaft is coupled to a fixed diameter driven wheel affixed to a driven shaft by an elastic drive belt for automatic changes in speed of the drive shaft relative to the driven shaft as power is transmitted between the two shafts.

Conventionally, speed changes in machinery are performed by transmissions wherein the changes are performed by changing radius ratios of drive wheels and driven wheels, i.e., pulleys, sprockets, gears and the like. Changing the radius ratios increases or decreases the speed of a driven wheel for a given speed of the drive wheel and, conversely, decreases or increases the torque applied to the driven wheel. Due to varying load conditions, it is often desirable to adjust the radius or speed ratios so that the torque load on the power source, whether a person, motor or engine, is within the capacity for efficient operation of the power source. One such situation exists for acceleration of a vehicle to a desired speed from a standing start.

Manual transmissions permit changes of radius ratios or gears to accomplish speed/torque control. Manual transmissions permit an operator of a machine to manually select the radius ratios or gears and permit operators to control operating speeds of a machine manually. Manual transmissions, while less popular in recent years, are still common in motor vehicles, particularly in trucks, and are almost universal in bicycles where the most common gear shifters comprise derailleur systems which move a chain among a series of two or more adjacent sprockets.

The most popular transmission in motor vehicles in the United States is the automatic transmission which automatically shifts gears within the transmission. The automatic transmission includes three major components: a torque converter, at least one planetary gear system, and a hydraulic control system. The torque converter is a hydraulic coupler composed of an impeller or pump and a turbine, plus a stator to multiply the torque. The torque converter is essential to the automatic transmission because it provides smooth clutching between the engine and the transmission gears. However, it is also the main source of inefficiency within the transmission.

A planetary gear system is composed of a sun gear, planet-pinions and an internal gear. The planetary gear system can provide an increase in speed with a decrease in torque, a decrease in speed with an increase in torque, or provide for changes between reverse, neutral and direct drive by locking one or more gearing members. More than one planetary gear set is often used in an automatic transmission to provide additional speed ratios. While gears are the most efficient power transmission elements, they have high precision requirements, are expensive to manufacture and generate noise in operation.

The hydraulic control system of a conventional automatic transmission comprises numerous components such as governors, servo bands, clutches, check valves, balance valves, modulator valves, pressure regulator valves and the like to control the transmission in response to sensed speed and throttle pressure. The hydraulic control system controls the shifting of the gears by either locking one or more of the sun gears or planet-pinions, or by activating servo bands or clutches. Thus, the hydraulic control system adds to the complications and expense of the conventional automatic transmission used in today's motor vehicles. In addition to the noted complexities, conventional automatic transmissions produce substantial amounts of heat and must be cooled for proper operation.

In summary, conventional automatic transmissions as used in many modern day motor vehicles are complicated, expensive, require substantial cooling and, upon failure, are expensive to repair.

Another form of automatic transmission is the variable-speed drive. Variable-speed drives provide an infinite number of speed ratios within a specific range, and may be made in the form of a cone drive, disk drive or belt drive. The belt drive is the most common variable-speed drive design with the variable speed ratios being achieved by changing the effective diameters of two pulleys. The pulleys are made of two flanges to fit a V-belt. One flange is fixed, and the other flange is adjustable in an axial direction. The separation of the two flanges changes the effective diameter of the pulley to the V-belt. While one pulley opens the flanges to reduce the effective diameter of that pulley, the other pulley pulls the flanges closer together to increase the effective diameter of that pulley. Then the speed ratio of the two pulleys reflects the new ratio of the effective diameters.

Some automatic transmissions using variable-speed drives have been developed and used on motorcycles, garden and farm equipment, as well as some small automobiles. In operation, the variable-speed drive automatic transmissions adjust the pulley widening and closing by electrical, hydraulic or mechanical means. In general, the torque or speed of a driven or driving pulley is sensed and then the flange gaps of the two pulleys are synchronously adjusted. Unfortunately, variable-speed drives primarily rely on friction between the pulley and the V-belt such that frictional losses are unavoidable, the tension of the belt must be accurately controlled by springs or linkage -controlled pulleys, there is a limitation of load capacity and slippage can not be completely avoided. Accordingly, variable-speed drives do not present a viable solution to the problems of conventional automatic transmissions.

In all of the above-described currently-known transmission and drive systems that utilize pulleys or belts, the belts employed therein are, and are designed to be, substantially non-elastic. (As used herein, "belts" include not only rubber and synthetic belts, but also cables (e.g., spring steel cables), ropes, etc., and any other material that may form a loop for use with a pulley system). That is, the belts of the prior art transmissions are designed to stretch lengthwise to only a minimal degree upon application of tension—i.e., these belts generally have a very high spring constant 'k.' While all belts will inherently possess some longitudinal expansibility—e.g., the natural expansibility of a rubber belt—in the designs of prior art transmission systems it is necessary and desirable to limit strictly this stretching capacity. One reason for strictly controlling the elasticity of transmission or drive system belts in the prior art is that an overly-strechable belt would introduce unwanted slack into the transmission system, disrupting the transmission of power. For instance, a belt made slack by stretching under tension—even if the stretching is only transient and the belt regains its former conformation upon cessation of the tension—may not make proper contact with the driving wheel or the driven wheel of the transmission, due to slippage or other undesirable effects. Further, the gearing ratio of prior art transmissions would be disrupted by speed changes introduced by belts whose length could change substantially under tension, as this length change would introduce differential wheel speeds (as set forth hereinbelow, in the present invention such elongation-induced differential speeds are a desirable and predictable result of the present design, but in the prior art would represent unpredictable and undesirable side effects). Accordingly, while prior art transmission systems necessarily tolerated a de minimis amount of elasticity in belts, the elongation associated with this elasticity is typically less than one percent (1%) under the maximum tension that was applied during use of the transmission system (i.e., the transmission belts of the prior art would stretch to a length no greater than one-hundred-and-one percent (101%) of their original length). A ten percent (10%) maximum stretch capacity of belts represents the outer limit of any workable prior art transmission, and those of ordinary skill in the art would consider even this ten percent stretch capacity undesirably high.

It is, thus, apparent that there is a need for improved automatic transmission designs to improve upon existing technology and to provide alternatives for designers in the many industries using automatic transmissions. Preferably, such improved designs would be simple, inexpensive and provide high reliability.

SUMMARY OF THE INVENTION

This need is met by the invention of the present application wherein methods and apparatus are provided for changing speeds between a driven shaft and a driven shaft during power transmission between the drive shaft and the driven shaft. Fixed diameter wheels are secured to the drive shaft and the driven shaft and a continuous elastic belt interconnects the drive wheel and the driven wheel. As power is transmitted between the wheels, one side of the elastic belt extending between the wheels is placed in tension and is elongated proportionally while the other side of the elastic belt is relaxed, untensioned and slack such that it is not elongated. The elongated portion of the belt remains in its elongated state as it passes around the wheel which is driving and the slack portion of the belt remains in its relaxed state as it passes around the wheel which is being driven. To accommodate the elongated state of the belt, the driving wheel must go faster than the driven wheel with the speed difference being dependent upon the amount of power and load being transmitted between the wheels and hence the amount of elongation of the elongated portion of the belt. The belt is selected so that the belt (or any particular portion thereof that is subjected to a load) is capable of stretching under tension to a maximum elongated length in a range from one-hundred-ten percent (110%) to two-thousand percent (2000%) of its initial, untensioned length of the belt or portion thereof (put differently, the elastic belt, or any tensioned portion thereof, has a maximal elongability of from ten percent (10%) to nineteen-hundred (1900%)).

Preferably, the elastic belt and the wheels are selected so as to provide substantially slip-free contact (i.e., high-traction engagement) between the belt and the wheels during use to ensure fully efficient power transmission under all conditions of use (including variable degrees of belt elongation). Such slip-free contact may be achieved by providing the belt with ribs that are separated by substantially constant distances for the relaxed portion of the belt but for the tensioned portion of the belt are separated by distances which vary in proportion to the tension placed on that portion of the belt. To reduce slippage of the belt as power is transmitted between the wheels, axial grooves sized to receive the ribs are formed around the periphery of the wheels. Alternatively, other appropriate preparation of the belt and wheel surfaces may reduce slippage (for instance, by advantageous selection of belts and wheel surfaces having high coefficients of static friction, or by provision of idler wheels that 'sandwich' the belt into close non-slipping contact with the driving and driven wheels).

In accordance with one aspect of the present invention, apparatus for transmitting power from a drive shaft to a driven shaft comprises a drive wheel having a fixed diameter and being affixed to the drive shaft, a driven wheel having a fixed diameter and being affixed to the driven shaft, and a continuous elastic drive belt of preselected maximum elongability connecting the drive wheel and the driven wheel. To reduce slippage, the drive wheel and the driven wheel may, for instance, include axially aligned grooves formed in their outer surfaces and the continuous elastic drive belt includes ribs sized to be received within the grooves. The grooves are spaced circumferentially around the drive wheel and the driven wheel to each receive a rib of the drive belt when the drive belt is slack. The apparatus may further comprise at least one idler wheel for engaging the drive belt to maintain the drive belt in contact with the drive wheel and at least one idler wheel for engaging the drive belt to maintain the drive belt in contact with the driven wheel.

In accordance with another aspect of the present invention, a method for transmitting power from a drive shaft to a driven shaft comprises the steps of: securing a fixed diameter drive wheel to the drive shaft; securing a fixed diameter driven wheel to the driven shaft; and, connecting the drive wheel to the driven wheel through an elastic drive belt. The method further comprises the step of providing that the elastic drive belt (and more specifically, a particular tensioned portion thereof) is capable of a known degree of elongation in proportion to the load applied thereto. To maintain the drive belt in contact with the drive wheel and the driven wheel, the method may further comprise the steps of: engaging the drive belt with at least one idler wheel associated with the drive wheel; and engaging the drive belt with at least one idler wheel associated with the driven wheel.

In accordance with yet another aspect of the present invention, a method for transmitting power from a drive shaft to a driven shaft comprises the steps of: securing a fixed diameter drive wheel to the drive shaft; securing a fixed diameter driven wheel to the driven shaft; and, coupling the drive wheel and the driven wheel to one another through an element that changes length, up to a predetermined maximal elongation, in response to differences in power/load applied to the drive shaft and the driven shaft.

In accordance with still another aspect of the present invention, a method for changing speeds during transmission of power between a drive shaft and a driven shaft comprises the steps of: securing a fixed diameter drive wheel to the drive shaft; securing a fixed diameter driven wheel to the driven shaft; and, coupling the drive wheel to the driven wheel through a drive belt of predetermined maximum elongability, so that a tensioned portion of the drive belt elongates in proportion to the power/load applied to the drive shaft and the driven shaft such that a shaft providing power rotates faster to accommodate the increased length of the tensioned belt portion and a shaft which receives power rotates slower in accordance with the unstressed length of the untensioned belt portion.

In accordance with an additional aspect of the present invention, a method for changing speeds during transmission of power between a drive shaft and a driven shaft comprises the steps of: securing a fixed diameter drive wheel to the drive shaft; securing a fixed diameter driven wheel to the driven shaft; coupling the drive wheel to the driven wheel through a continuous elastic drive belt, a portion of the belt to which a load will be applied having a slack length and a instantaneous tensioned length (and a maximal tensioned length based on the maximal elasticity of the belt), the instantaneous tensioned length of the tensioned belt portion being proportional to power/load applied to the drive shaft and the driven shaft; receiving the elastic drive belt portion in a tensioned state by the drive wheel to rotate the drive wheel at a first speed defined by movement of the drive wheel to take-up the elastic drive belt portion in the tensioned state; and, receiving an untensioned portion of the elastic drive belt in a slack state by the driven wheel to rotate the driven wheel at a second speed defined by movement of the driven wheel to take-up the elastic drive belt in the slack state, the second speed being less than the first speed.

It is, thus, an object of the present invention to provide a method and apparatus for an improved speed changing automatic transmission that is simple yet highly reliable, inexpensive both in initial cost and for maintenance; and to provide a method and apparatus for an improved speed changing automatic transmission wherein an elastic belt is used to couple a drive wheel to a driven wheel.

Other objects and advantages of the invention will be apparent from the following description, the accompanying drawings and the appended claims.

DETAILED DESCRIPTION OF THE INVENTION

Figure 1:
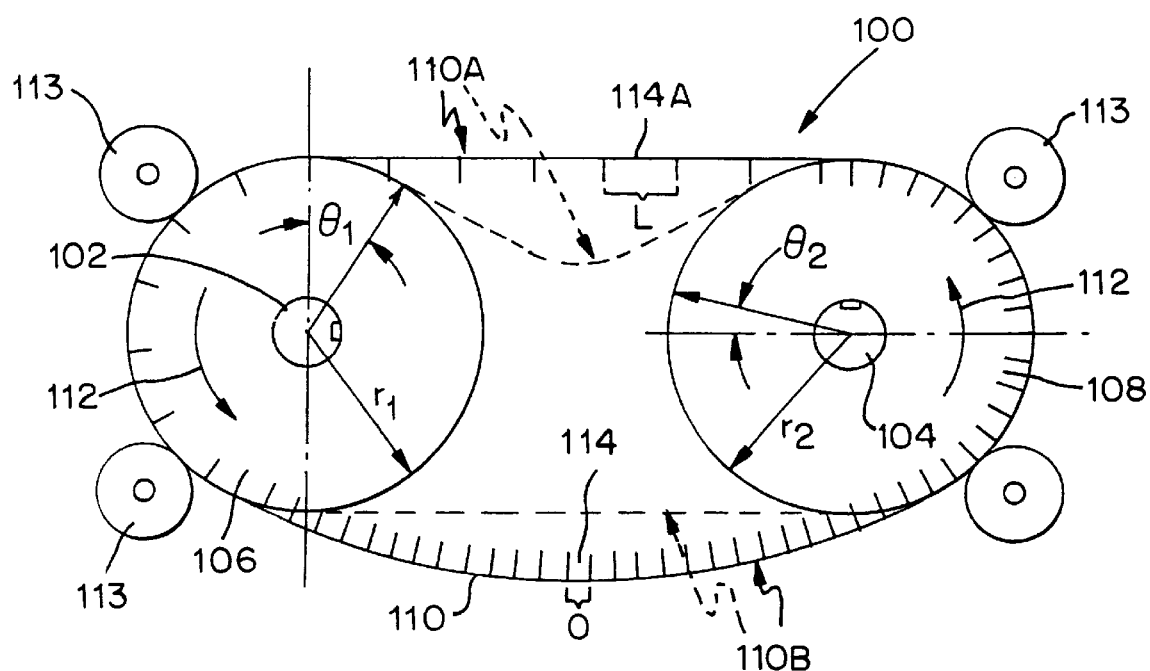
FIG. 1 is a schematic side view of apparatus operable in accordance with the present invention for changing speeds during transmission of power between a drive shaft and a driven shaft.

The invention will now be described with reference to the drawings wherein FIG. 1 schematically illustrates automatic transmission apparatus 100 for speed changing during transmission of power from a drive shaft 102 to a driven shaft 104. The apparatus 100 comprises a drive pulley or wheel 106 which is keyed, splined or otherwise affixed to the drive shaft 102. A driven pulley or wheel 108 is similarly keyed, splined or otherwise affixed to the driven shaft 104. Both the drive wheel 106 and the driven wheel 108 are of fixed diameter such that the radius ratio of the two wheels 106, 108 is predetermined. As illustrated in FIG. 1, the radius $r_1$, of the drive wheel 106 and the radius $r_2$ of the driven wheel 108 are the same size and the radius ratio is thus 1. Of course, the radii of the drive wheel 106 and the driven wheel 108 and the resulting radius ratio can be selected as required for a given application.

A continuous elastic drive belt 110 is connected around the drive wheel 106 and the driven wheel 108 to transmit power between the two wheels 106, 108. While power is normally transmitted from the drive wheel 106 to the driven wheel 108, power can be transmitted in the reverse direction, i.e., from the driven wheel 108 to the drive wheel 106. Such reverse power transmission occurs, for example, when the power provided by a power source is reduced and the inertia of a load connected to the driven wheel 108 through the driven shaft 104 is transmitted to the power source through the drive wheel 106 and the drive shaft 102 and dissipated by the power source. Such reverse power transmission is experienced, for example, when the speed of a motor vehicle is reduced by slowing the engine which is then driven by the inertia of the motor vehicle through the wheels and transmission of the motor vehicle. Another example is when the rotational direction of the drive shaft 102 is reversed for instance to back up a motor vehicle.

In either event, the elastic drive belt 110 elongates as forces are applied to the belt 110, i.e., the belt 110 is placed in tension. As shown in solid line drawing in FIG. 1, for transmission of power from the drive wheel 106 to the driven wheel 108, with the wheels 106, 108 turning in the direction of the arrows 112, the upper part 110A of the belt 110 transmits power from the drive wheel 106 to the driven wheel 108. Thus, the upper part 110A of the belt 110 is in tension and elongates, preferably in direct proportion to the power/load within the system including the automatic transmission apparatus 100. The lower part 110B of the belt 110 does not carry the load and, therefore, it is in a state of relaxation or is slack. The belt possesses an intrinsic maximal elongability under conditions of use in the transmission system. This intrinsic elongability may be predetermined by applying to a particular belt or a portion thereof the maximal amount of tension that is expected to be applied in the transmission system in use. Belts or pulleys—regardless of their composition (e.g., a rubber belt; a flexible extensible steel cable)—will stretch according to a substantially linear relationship of the form $F=k\partial x$, wherein F is the applied force or tension, $\partial x$ is the change (increase) in belt length, and k is a spring constant. The intrinsic percent elongability of a particular belt (or of any tensioned portion thereof) can be expressed as $(\partial x_{max} x)$, where $\partial x_{max}$ is the change in belt or belt portion length under application of maximal tension that is or will be developed in a particular transmission system, and x is the untensioned length of the belt or portion thereof. As set forth hereinabove, in all conventional transmissions or drive systems of the prior art, belt elongation is essentially an unavoidable and undesirable artifact, and belts used in the prior art have intrinsic percent elongability of less than ten percent (10%), and typically of one percent (1%) or less.

In contrast, in the present invention belts of intrinsic elongability ranging from ten percent (10%) up to nineteen-hundred percent (1900%) are advantageously employed to generate differential speed ratios between the driving and driven wheels. Under varying conditions of actual use (i.e., varying applied loads/tensions), the actual elongation of the belts (or tensioned portions thereof) of the present invention will range from nil up to the maximum intrinsic elongation of the particular belt, $\partial x_{max}$. The belts of the present invention are selected so as to show substantially no permanent strain or "stretch memory" over their use lifetime; that is, they behave substantially as ideal springs and return to substantially their original untensioned length when an applied tension or load is removed.

Figure 2:
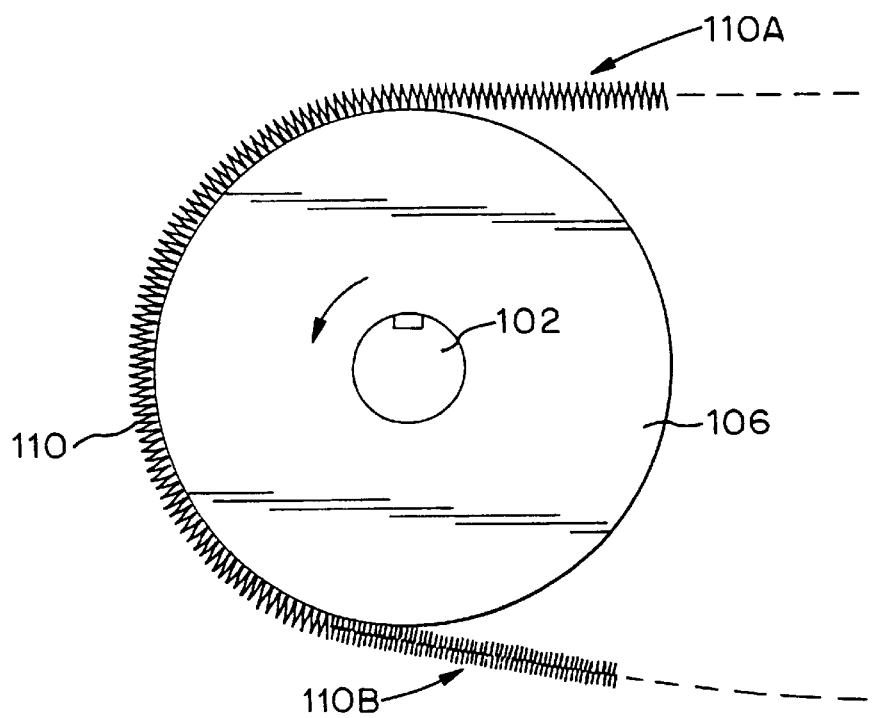
FIG. 2 is a schematic side view of a drive wheel affixed to a drive shaft illustrating an elastic drive belt tensioned prior to being and while engaged with the drive wheel and detensioned or allowed to go slack upon disengagement from the drive wheel.

The portions of the belt 110 which are in tension and slack are reversed when power is transmitted from the driven wheel 108 to the drive wheel 106 as shown by the dashed lines in FIG. 1. This is true regardless of the direction of rotation of the wheels 106, 108 as should be apparent. FIG. 2 illustrates a folded or accordion belt design placed in tension above and around the drive wheel 106 and going slack once it is disengaged from the drive wheel 106. It is noted that the elastic drive belt 110 is elastic within the entire power/load range which is possible within the driven system including the automatic transmission apparatus 100 to ensure that the belt 110 is not inelastically deformed (i.e., permanently stretched) due to an overload condition. Idler wheels 113 preferably are provided for engaging the drive belt 110 to maintain the drive belt 110 in contact with the drive wheel 106 and in contact with the driven wheel 108.

The theory of operation of the invention will now be described with further reference to FIG. 1. Assume a small segment 114 of the belt 110 in the lower part 110B has a relaxed length of 1. As the segment 114 engages and passes around the driven wheel 108, the corresponding rotation angle $\theta_2$ of the driven wheel is given by the equation:

$$\theta_2 = l/r_2 \qquad \text{(Eq. 1)}$$

When there is no friction and no load on the driven wheel 108, the belt 110 is not in tension and therefore, the belt 110 segment 114 remains at a length of 1. (That is, the elongation $\partial x$ is zero). The drive wheel 106 needs only to rotate through a rotation angle $\theta_1$ which is given by the equation:

$$\theta_1 = l/r_1 \qquad \text{(Eq. 2)}$$

During the no load condition, the speed ratio of the two wheels 108, 106 is:

$$\gamma = \omega_2/\omega_1 = \theta_2/\theta_1 = (1/r_1)/(1/r_2) = r_1/r_2 \qquad \text{(Eq. 3)}$$

When the load on the driven wheel 108 is increased, for example when a motor vehicle goes uphill, or when the torque load on a machine is increased, more tension is applied to the elastic drive belt 110, to generate more torque to rotate the driven wheel 108. Since the wheel diameters are fixed, this tension creates elongation of the upper portion 110A of the elastic drive belt 110. The length of a corresponding segment 114A of the upper portion 110A of the belt 110 is thus increased to L which is given by the equation:

$$L = l + F/k \qquad \text{(Eq. 4)}$$

where F is the tension in the upper portion 110A of the elastic drive belt 110 and k is the spring constant of the elastic drive belt 110.

The elongated section of the belt 110, i.e., as illustrated the upper portion 110A of the belt 110, reaches the drive wheel 106 as the drive wheel 106 pulls the belt 110 toward it. The greater the elongation of the segment 114A of the belt 110, the larger the angle $\theta_1$ the drive wheel 106 has to rotate to accommodate the elongated belt segment 114A. The matching rotational angle of the drive wheel 106 is then given by the equation:

$$\theta_1 = L/r_1 = (1/r_1)(1 + F/k) \qquad \text{(Eq. 5)}$$

while the matching rotational angle of the driven wheel remains the same:

$$\theta_2 = 1/r_2 \qquad \text{(Eq. 6)}$$

Thus, the higher the torque load applied to the driven wheel 108, the larger the tension in the upper portion 110A of the belt 110, the longer the elongated segments represented by the segment 114A and the larger the turn or rotational angle $\theta_1$ of the drive wheel 106 which is required in order to rotate the driven wheel 108 through the angle $\theta_2$ which is determined by the shorter relaxed or slack lengths of the belt segments represented by the segment 114. The speed ratio of the two wheels 106, 108 becomes:

$$\gamma = \omega_2/\omega_1 = \theta_2/\theta_1 = (1/r_2)/(1/r_1)(1+F/k)) = (r_1/r_2)(1/(1+(F/k)))) \qquad \text{(Eq. 7)}$$

The elastic drive belt 110 is designed such that its elongated length, see solid line 110A, is many times the relaxed or slack length, see solid line 110B, of the belt 110, yet the belt 110 remains elastic within the entire power/load range which is possible within the driven system to ensure that the belt 110 is not inelastically deformed due to an overload condition. Since $r_1$, $r_2$, 1 and k are design constants, the speed ratio $\gamma$ is approximately inversely proportional to the tension F in the belt 110 or the torque load at the driven wheel 108, i.e.:

$$\gamma \sqrt{1/F} \qquad \text{(Eq. 8)}$$

Thus, the speed of the driven wheel 108 is adjusted (along with the elongation of the drive belt) according to the load, even if the drive wheel 106 maintains a constant speed. Similar speed changes occur if the power source speeds up, the power/load reverses, as described above, and generally for standard operation of a vehicle or other machine including the automatic transmission apparatus 100. As described above, the drive system of the present application does not require sophisticated sensing and control arrangements. A simple elastic belt, the drive belt 110, can take care of both sensing the torque load, and the self-adjusting or conforming of the drive system to the load as the load conditions change. The self-adjustment of the drive system is accomplished without changing the effective radii of the wheels 106, 108, and can be applied in a new type of automatic transmission for use in a wide variety of applications including bicycles, lawn and garden equipment, tractors, motorcycles, automobiles, and other machinery for effecting automatic speed changes as the load changes.

The elastic drive belt 110 should be as close to perfectly elastic as possible to prevent energy dissipation and to maintain efficiency high, close to one-hundred percent (100%) is currently believed to be possible. It is currently preferred to make the elastic drive belt 110 from spring steel; however, other materials can be used. The elastic drive belt must be designed such that it is sufficiently flexible that it can evenly engage and conform to the wheels 106, 108, provide an elastic elongation of from nil (when no load is applied) up to twenty (20) times its relaxed or slack length (when maximal load is applied) and, of course, provide sufficient strength that it can withstand power and loads experienced within the automatic transmission apparatus 100. Two exemplary belt designs will now be described which can be used in the present invention. Other designs will undoubtedly be suggested to those skilled in the art from these descriptions.

Figure 3:
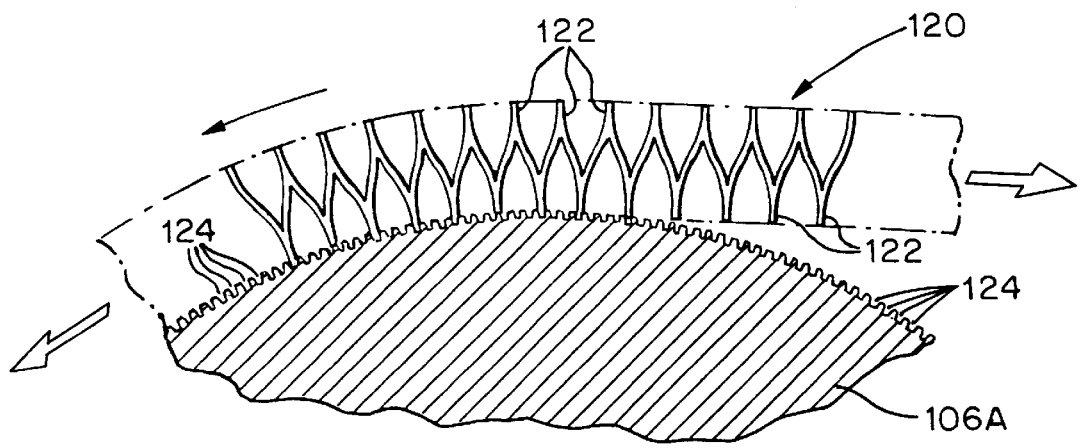
FIG. 3 schematically illustrates one embodiment of the present invention in which a portion of a drive wheel and tensioned elastic drive belt becoming engaged therewith showing axially aligned grooves on the drive wheel for receiving ribs of the elastic drive belt.
Figure 3A:
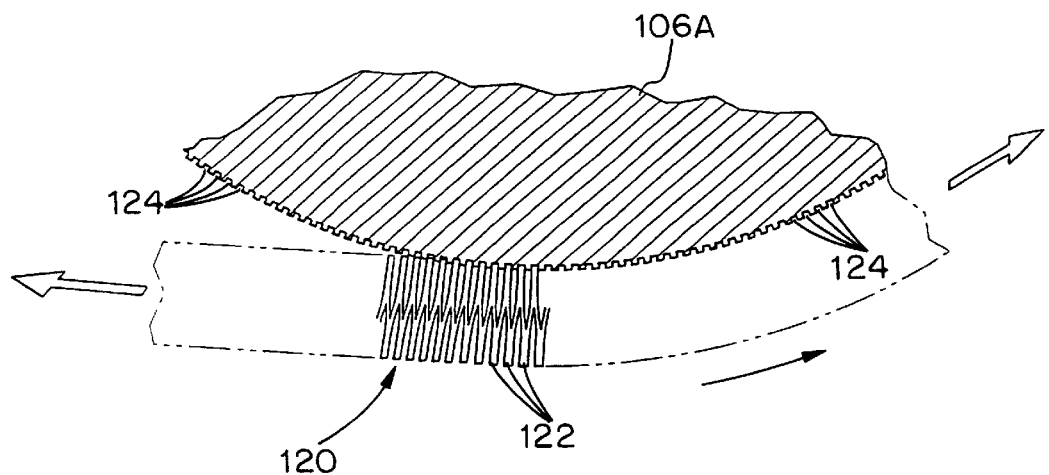
FIG. 3A further illustrates the embodiment of the present invention depicted in FIG. 3, showing the fashion in which ribs of the drive belt engage spaced grooves of the drive wheel for improved traction.
Figure 4:
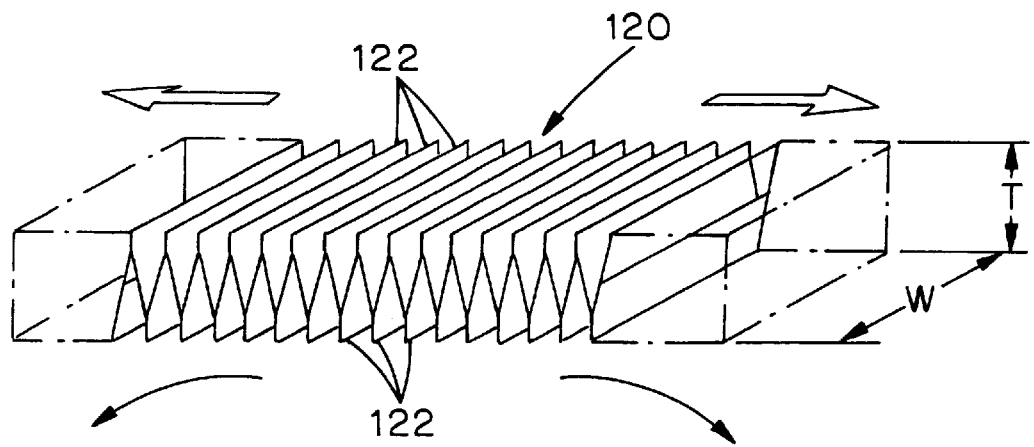
FIGS. 4 and 5 illustrated in perspective a first form of elastic drive belt which can be used in the invention of the present application and as shown in FIG. 3.
Figure 5:
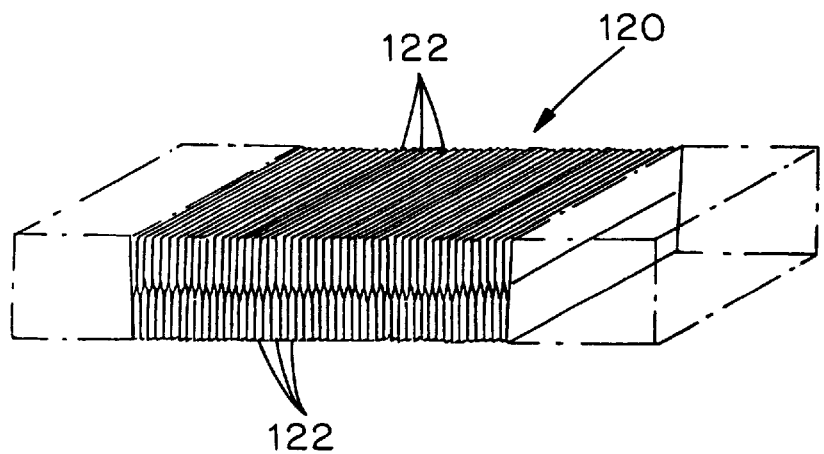

As shown in FIGS. 3 and 3A–5, a first design of an elastic drive belt 120 includes an accordion structure which is illustrated in elongation in FIGS. 3 and 4, and in relaxation or in its slack state in FIGS. 3A and 5. As shown in FIGS. 3–5, the folds of the accordion structure terminate in tongues, teeth or flat ribs 122 which extend laterally across the elastic drive belt 120. The ribs 122 help to avoid slippage as the belt 120 is engaged with the wheels 106, 108. As illustrated in FIG. 3, a drive wheel 106A includes miniature axially aligned grooves 124 formed into its outer surface with the grooves 124 being sized to receive the ribs 122. The drive wheel and driven wheel of the automatic transmission apparatus 100, such as the drive wheel 106 and the driven wheel 108, would both have the grooves 122 formed therein. Since the drive belt 122 is elastic and flexible, an exact match between the grooves 124 and the ribs 122 is not necessary. Many grooves 124 on a wheel may be covered between adjacent ones of the ribs 122. However, preferably, the grooves 124 are spaced circumferentially around the drive wheel and the driven wheel to each receive one of the ribs 122 of the elastic drive belt 120 when the drive belt 120 is slack.

Figure 6:
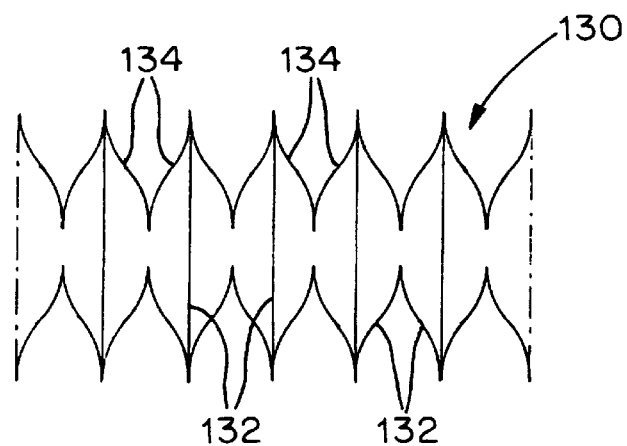
FIGS. 6 and 7 are plan and perspective views, respectively, of a second form of elastic drive belt which can be used in the invention of the present application.
Figure 7:
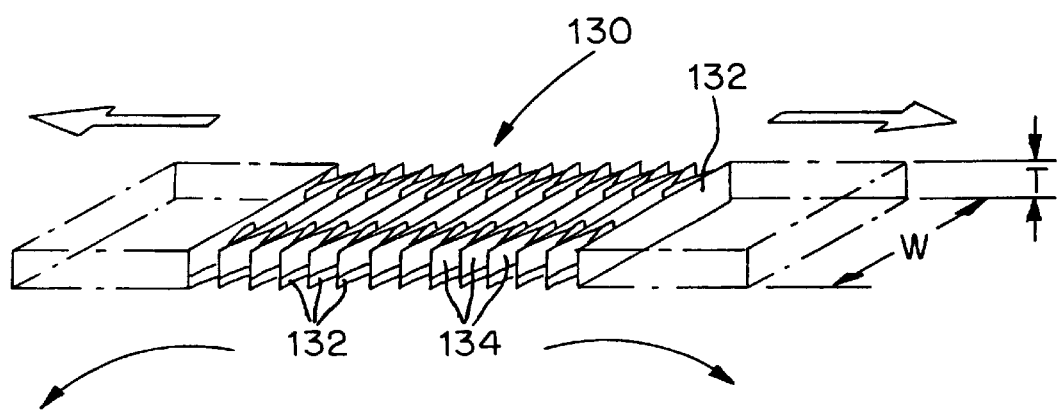

A second design of an elastic drive belt 130 is shown in FIGS. 6 and 7. The elastic drive belt 130 includes a series of ribs 132 which are interconnected at either end by accordion springs 134 which maintain the ribs 132 parallel to one another while permitting them to move away and toward one another in an elastic manner as required. As illustrated, the ribs 132 of the elastic drive belt 130 extend only beyond the accordion springs 134 on the bottom as illustrated in FIG. 7 for engagement with a drive wheel and a driven wheel. However, the ribs 132 of the elastic drive belt 130 could also extend above the accordion springs 134 if it was desired to have the ribs 132 of the drive belt 130 engage axially aligned grooves (not shown) in the idler wheels 113. The width W and thickness T of the drive belts 120, 130 are selected to provide appropriate parameters for the drive belts in a given application.

Additional embodiments of the elastic drive belt of the present invention will suggest themselves to those or ordinary skill in the art. For instance, the necessary low-slip or no-slip engagement between the elastic drive belt and the driving and driven wheels may be provided by means other than the above-described groove/rib system. Appropriate selection and preparation of the materials used in the drive belts and wheels may increase the static coefficient of friction therebetween, thus greatly decreasing slippage. Chemical belt dressings may also provide a tackified grip between belt and wheel, also decreasing slippage. Idler wheels may be used to urge the belt into non-slipping contact with the driving and driven wheels. A wide combination of belt and wheel selections is possible, so long as the belt remains engaged with the wheel surface with substantially little or no slippage for all degrees of belt elongation.

The simplicity of the automatic transmission apparatus 100 of the present application is a major advantage over prior art transmissions. The automatic transmission apparatus 100 should be less troublesome, more reliable and much cheaper to build and maintain. It also will be lighter and more compact, which will increase the efficiency of the vehicle or other equipment for which it is utilized. The automatic transmission apparatus has high efficiency, as there is no energy loss in hydraulic coupling and torque converters. Complicated hydraulic control systems and friction clutches are eliminated as are high precision and expensive gear systems. Operation is very smooth and substantially noiseless.

Reversal of the automatic transmission apparatus is easily achieved by reversing the direction of the drive wheel 106 such that the tension in the lower portion of the elastic drive belt is increased and the upper portion of the drive belt becomes slack. No special maintenance care should be needed and the automatic speed adjustments remain for reverse motion the same as for forward motion. Special arrangements are not needed for locking the transmission while a vehicle is parked since self-locking is provided, as long as the power source is engaged to the drive shaft, because the driving wheel and driven wheel are still connected by the elastic drive belt.

Most motor vehicles equipped with current-day motor vehicle automatic transmissions can not be "push- started" as can motor vehicles equipped with manual transmissions. The automatic transmission apparatus 100 of the present application allows for push starting a motor vehicle, for example when its battery is low. Operation of the transmission of the present application should be smoother than traditional automatic transmissions which change or shift the gear ratios by using hydraulically activated clutches and bands. If the gear ratio change is made too abruptly, persons in the motor vehicle are jarred and the transmission wears quickly. If the shift is made too smoothly, the friction faces of the clutches and bands are destroyed by excess heat. To reduce these problems, control of clutches and bands in conventional automatic transmissions must be precise. The automatic transmission of the present application does not present any of these problems and is particularly useful and should be important for electrical cars where easy operation, compact structure and light weight are essential. The present invention also provides a simple and highly useful alternative for transmission of power in bicycles, which traditionally use multiple-gear systems for providing differential speeds. The automatic transmission of the present application is also a good choice for motorcycles or motorscooters, which require compact and easily maintained transmissions. Finally, the automatic transmission of the present application is also useful for many industrial machines including elevators, lawn mowers, tractors as well as other machines and vehicles.

I have thus described the invention of the present application in detail and by reference to particular preferred embodiments thereof, but it will be apparent to those of ordinary skill in the art that modifications and variations are possible without departing from the spirit and scope of the invention defined in the appended claims.

I claim as my invention:

1. An apparatus for transmitting power from a drive shaft to a driven shaft comprising:

a drive wheel having a fixed diameter and being affixed to said drive shaft;

a driven wheel having a fixed diameter and being affixed to said driven shaft;

a continuous elastic drive belt connecting said drive wheel and said driven wheel;

wherein under application of tension in the apparatus, a tensioned portion of said drive belt is elongated lengthwise by from ten percent (10%) to nineteen-hundred percent (1900%) beyond the untensioned length of said portion, and wherein there is substantially slip-free engagement between said belt and said wheels.

2. The apparatus of claim 1, wherein the elongation of the tensioned portion of the belt is between twenty percent (20%) and nineteen hundred percent (1900%) of the untensioned length of the portion.

3. The apparatus of claim 1, wherein the elongation of the tensioned portion of the belt is between fifty percent (50%) and nineteen hundred percent (1900%) of the untensioned length of the portion.

4. The apparatus of claim 1, wherein the elongation of the tensioned portion of the belt is between one hundred percent (100%) and nineteen hundred percent (1900%) of the untensioned length of the portion.

5. The apparatus of claim 1, wherein the elongation of the tensioned portion of the belt is between two hundred percent (200%) and nineteen hundred percent (1900%) of the untensioned length of the portion.

6. The apparatus of claim 1, wherein the elongation of the tensioned portion of the belt is between four hundred percent (400%) and nineteen hundred percent (1900%) of the untensioned length of the portion.

7. The apparatus of claim 1 wherein the elongation of the tensioned portion of the belt is between fifty percent (50%) and one thousand percent (1000%) of the untensioned length of the portion.

8. The apparatus of claim 1 wherein the elongation of the tensioned portion of the belt is between two hundred percent (200%) and one thousand percent (1000%) of the untensioned length of the portion.

9. A method for transmitting power from a drive shaft to a driven shaft comprising the steps of:

provifing a fixed diameter drive wheel on said drive shaft;

providing a fixed diameter driven wheel on said driven shaft; and connecting said drive wheel to said driven wheel through an elastic drive belt applying tension by one of said wheels to a portion of said drive belt, such that said tensioned portion of said drive belt is elongated lengthwise by from ten percent (10%) to nineteen-hundred percent (1900%) beyond its untensioned length, wherein there is substantially slip-free engagement between said belt and said wheels.

10. The method of claim 9, wherein said tensioned portion of said drive belt is elongated lengthwise by between twenty percent (20%) and nineteen hundred percent (1900%) of the untensioned length of the portion.

11. The method of claim 9, wherein said tensioned portion of said drive belt is elongated lengthwise by between fifty percent (50%) and nineteen hundred percent (1900%) of the untensioned length of the portion.

12. The method of claim 9, wherein said tensioned portion of said drive belt is elongated lengthwise by between one hundred percent (100%) and nineteen hundred percent (1900%) of the untensioned length of the portion.

13. The method of claim 9, wherein said tensioned portion of said drive belt is elongated lengthwise by between two hundred percent (200%) and nineteen hundred percent (1900%) of the untensioned length of the portion.

14. The method of claim 9, wherein said tensioned portion of said drive belt is elongated lengthwise by between four hundred percent (400%) and nineteen hundred percent (1900%) of the untensioned length of the portion.

15. The method of claim 9, wherein said tensioned portion of said drive belt is elongated lengthwise by between fifty percent (50%) and one thousand percent (1000%) of the untensioned length of the portion.

16. The method of claim 9, wherein said tensioned portion of said drive belt is elongated lengthwise by between two hundred percent (200%) and one thousand percent (1000%) of the untensioned length of the portion.

17. A method for transmitting power from a drive shaft to a driven shaft comprising the steps of:

providing a fixed diameter drive wheel on said drive shaft;

providing a fixed diameter driven wheel on said driven shaft; and coupling said drive wheel and said driven wheel to one another through a drive belt that reversibly changes length in response to differences in load applied to said drive shaft and said driven shaft, wherein the change in length of a portion of said belt under said load is between ten percent (10%) and nineteen hundred percent (1900%) of the length of said portion in the absence of any load thereupon and wherein there is substantially slip-free engagement between said belt and said wheels.

18. A method for changing speeds during transmission of power between a drive shaft and a driven shaft comprising the steps of:

providing a fixed diameter drive wheel on said drive shaft;

providing a fixed diameter driven wheel on said driven shaft;

coupling said drive wheel to said driven wheel through a drive belt a portion of which elongates in direct proportion to the power or load applied to said drive shaft and said driven shaft such that the drive shaft rotates faster to accommodate the increased length of said elongated portion of said belt and the driven shaft rotates slower in accordance with an unelongated portion of said belt, wherein the elongated portion of said belt has an increased length at least ten percent (10%) greater than the unelongated length of said portion and wherein there is substantially slip-free engagement between said belt and said wheels.

* * * * *

UNITED STATES PATENT AND TRADEMARK OFFICE
CERTIFICATE OF CORRECTION

PATENT NO. : 6,135,907
DATED : October 24, 2000
INVENTOR(S) : Hong

It is certified that error appears in the above-identified patent and that said Letters Patent is hereby corrected as shown below:

Column 2,
Line 50, "linkage -controlled" should read -- linkage-controlled --

Column 3,
Line 5, "strechable" should read -- stretchable --

Column 4,
Line 58, line 58 should be appended to the previous line

Column 5,
Line 61, "illustrated" should read -- illustrate --

Column 6,
Line 62, "$(\partial x_{max} x)$," should read -- $(\partial x_{max}/x)$, --

Column 7,
Line 42, (Eq. 1), "$\theta_2 =/1r_2$" should read -- $\theta_2 = 1/r_2$ --
Line 48, (Eq. 2), "$\theta_1 =/1r_1$" should read -- $\theta_1 = 1/r_1$ --

Column 8,
Line 39, (Eq. 8), "$\gamma \sqrt{1/F}$" should read -- $\gamma \infty 1/F$ --

Column 10,
Line 22, " "push- started" " should read -- "push-started" --

UNITED STATES PATENT AND TRADEMARK OFFICE
CERTIFICATE OF CORRECTION

PATENT NO. : 6,135,907
DATED : October 24, 2000
INVENTOR(S) : Hong

It is certified that error appears in the above-identified patent and that said Letters Patent is hereby corrected as shown below:

Column 11,
Line 37, "and" should be deleted
Line 39, "belt" should read -- belt; and --

Signed and Sealed this

Twenty-eighth Day of May, 2002

Attest:

*Attesting Officer*

JAMES E. ROGAN
*Director of the United States Patent and Trademark Office*